United States Patent [19]

Wyman

[11] Patent Number: 5,745,879
[45] Date of Patent: *Apr. 28, 1998

[54] METHOD AND SYSTEM FOR MANAGING EXECUTION OF LICENSED PROGRAMS

[75] Inventor: Robert M. Wyman, Waltham, Mass.

[73] Assignee: Digital Equipment Corporation, Maynard, Mass.

[*] Notice: The term of this patent shall not extend beyond the expiration date of Pat. No. 5,204,897.

[21] Appl. No.: 523,919

[22] Filed: Sep. 6, 1995

Related U.S. Application Data

[63] Continuation of Ser. No. 361,884, Dec. 22, 1994, abandoned, which is a continuation of Ser. No. 697,652, May 8, 1991, abandoned.

[51] Int. Cl.[6] .................................................. G06F 17/60
[52] U.S. Cl. ............................... 705/1; 705/8; 380/4
[58] Field of Search ........................... 380/4, 23, 25; 364/401, 402, 406; 340/825.31, 825.34, 825.35; 395/201, 207, 208, 230; 705/1, 7, 8, 30

[56] References Cited

U.S. PATENT DOCUMENTS

| | | |
|---|---|---|
| 4,780,821 | 10/1988 | Crossley. |
| 4,791,565 | 12/1988 | Dunham et al.. |
| 4,924,378 | 5/1990 | Hershey et al.. |
| 4,937,863 | 6/1990 | Robert et al. .......................... 380/4 |
| 4,949,248 | 8/1990 | Caro ...................................... 364/401 |
| 5,023,907 | 6/1991 | Johnson et al. ....................... 380/4 |
| 5,103,476 | 4/1992 | Waite et al. ........................... 380/4 |
| 5,138,712 | 8/1992 | Corbin. |
| 5,204,897 | 4/1993 | Wyman ................................. 380/4 |
| 5,260,999 | 11/1993 | Wyman. |
| 5,390,297 | 2/1995 | Barber et al. ......................... 380/4 |
| 5,438,508 | 8/1995 | Wyman. |
| 5,553,143 | 9/1996 | Ross et al.. |

OTHER PUBLICATIONS

Wyman, "Future Directions in Digital Distributed Software License Architecture," Oral presentation, DECUS (Digital Equipment Computer User Society), Marlboro, MA, May 10, 1990, 18 pp.

*Primary Examiner*—Robert A. Weinhardt
*Attorney, Agent, or Firm*—Anne E. Saturnelli; Arthur W. Fisher

[57] ABSTRACT

A distributed computer system employs a license management system to account for software product usage. A management policy having a variety of alternative styles and contexts is provided. Each licensed program upon start-up makes a call to a license server to check on whether usage is permitted, and the license server checks a database of the licenses, called product use authorizations, that it administers. If the particular use requested is permitted, a grant is returned to the requesting user node. The product use authorization is structured to define a license management policy allowing a variety of license alternatives by values called "style", "context", "duration" and "usage requirements determination method". The license administration may be delegated by the license server to a subsection of the organization, by creating another license management facility duplicating the main facility. The license server must receive a license document (a product use authorization) from an issuer of licenses, where a license document generator is provided. A mechanism is provided for one user node to make a call to use a software product located on another user node; this is referred to as a "calling card", by which a user node obtains permission to make a procedure call to use a program on another node.

29 Claims, 5 Drawing Sheets

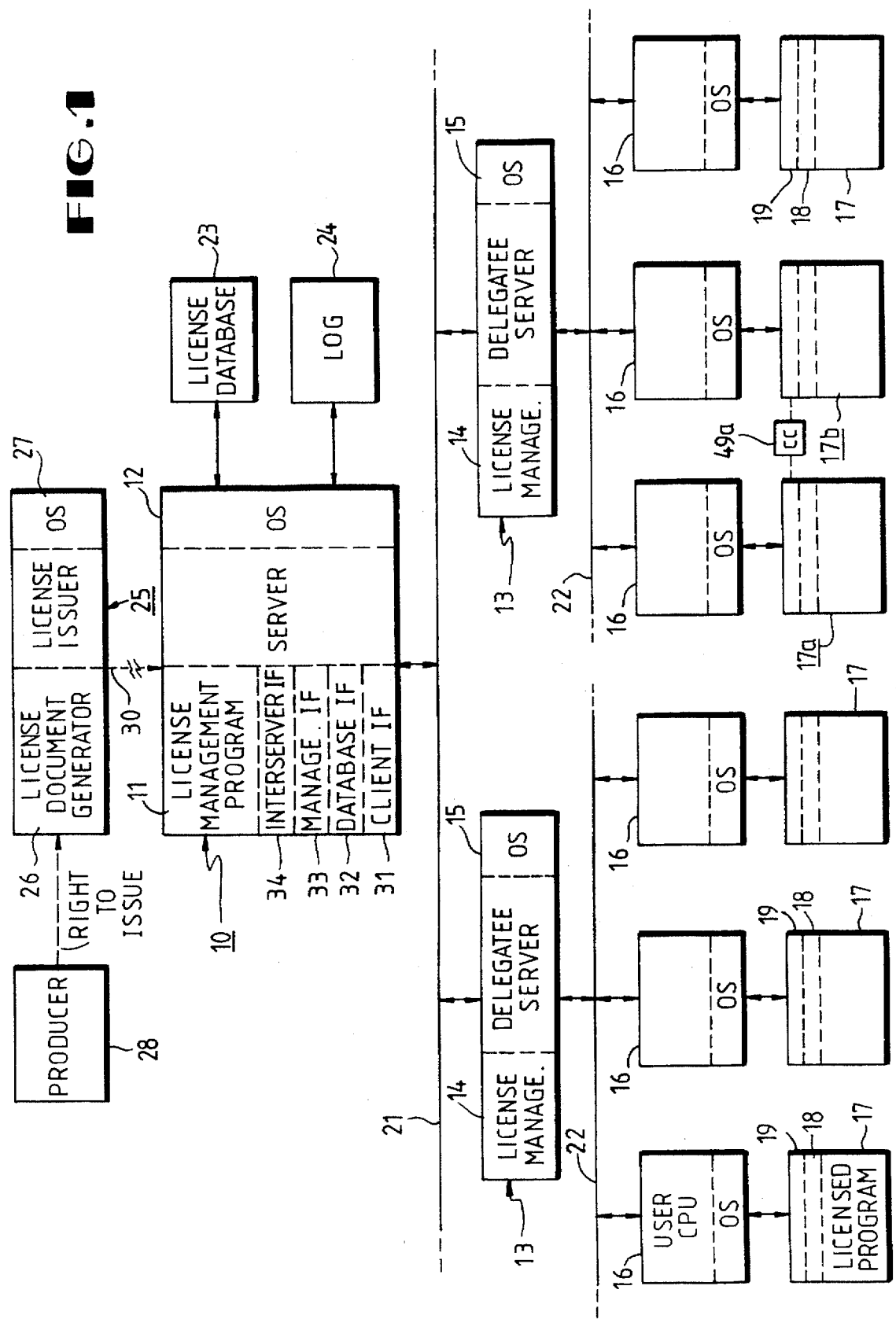

FIG. 2

License (Product Use Authorization)

| Field | Ref |
|---|---|
| Product Name | 35, 36 |
| Producer | |
| Version Nos. | |
| Release Date | |
| Issuer | 37 |
| Licensee | 38 |
| Start Date | 40 |
| End Date | |
| Units Granted | 41 |
| Units Available | 42 |
| Style | 43 |
| Context | 44 |
| Duration | 45 |
| LURDM | 46 |
| LURT | 47 |
| Delegation Auth. | 48 |
| Calling Auth. | 49 |
| Combination Auth. | 50 |
| Overdraft Auth. | 51 |
| Token: | 52 |
| Signature | 53 |
| Check Sum | 54 |

FIG. 4

License Unit Requirements Table

| Row Selector | Columns | | |
|---|---|---|---|
| Platform ID | A | B | C |
| PC-0 | 10 | 230 | -1 |
| PC-1 | 12 | 230 | -1 |
| VAX 6210 | 158 | 300 | 150 |

FIG. 3

| Style (43) | Context (44) | Duration (45) | LURDM (46) |
|---|---|---|---|
| Allocative | Network | Transaction | Constant |
| Consumptive | Execution_Domain | Assignment | Table Lookup |
| Private | Login_Domain | Immediate | Private |
| | Node_ID | | |
| | Process_Family | | |
| | Process | | |
| | User_Name | | |
| | Product_Name | | |
| | Operating_System | | |
| | Platform_ID | | |
| | Private | | |

METHOD AND SYSTEM FOR MANAGING EXECUTION OF LICENSED PROGRAMS

This application is a continuation of application Ser. No. 08/361,884, filed Dec. 22, 1994, now abandoned, which is a continuation of application Ser. No. 07/697,652, filed May 8, 1991, now abandoned.

BACKGROUND OF THE INVENTION

This invention relates to methods of operation of computer systems, and more particularly to a method and system for managing the licensing of software executed on computer systems.

In U.S. Pat. No. 4,937,863, issued to Robert, Chase and Schafer and assigned to Digital Equipment Corporation, the assignee of this invention, a Software Licensing Management System is disclosed in which usage of licensed software may be monitored in a computer system to determine if a use is within the scope of a license. The system maintains a database of licenses for software products, and stores a unit value indicating the number of licensing units for each product. When a user wishes to use a licensed product, a message is sent to the central license management facility requesting a license grant. In response to this message, the facility accesses the database to see if a license exists for this product, and, if so, whether units may be allocated to the user, depending upon the user's characteristics, such as the configuration of the platform (CPU) which will execute the software product. If the license management facility determines that a license can be granted, it sends a message to the user giving permission to proceed with activation of the product. If not, the message denies permission.

While the concepts disclosed in the U.S. Pat. No. 4,937,863 are widely applicable, and indeed are employed in the present invention, there are additional functions and alternatives that are needed in some applications. For example, the license management system should allow for simultaneous use of a wide variety of different licensing alternatives, instead of being rigidly structured to permit only one or only a few. When negotiating licenses with users, vendors should have available a wide variety of terms and conditions, even though a given vendor may decide to narrow the selection down to a small number. For example, a software product may be licensed to a single individual for use on a single CPU, or to an organization for use by anyone on a network, or for use by any users at terminals in a cluster, or only for calls from another specific licensed product, or any of a large number of other alternatives. A vendor may have a large number of products, some sold under one type of license and some under others, or a product may be a composite of a number of features from one or more vendors having different license policies and prices; it would be preferable to use the same license management system for all such products.

Distributed computing systems present additional licensing issues. A distributed system includes a number of processor nodes tied together in a network of servers and clients. Each node is a processor which may execute programs locally, and may also execute programs or features (subparts of programs) via the network. A program executing on one node may make remote procedure calls to procedures or programs on other nodes. In this case, some provision need be made for defining a license permitting a program to be executed in a distributed manner rather than separately on a single CPU, short of granting a license for execution on all nodes of a network.

In a large organization such as a company or government agency having various departments and divisions, geographically dispersed, a software license policy is difficult to administer and enforce, and also likely to be more costly, if individual licenses are negotiated, granted and administered by the units of the organization. A preferred arrangement would be to obtain a single license from the software producer, and then split this license into locally-administered parts by delegation. The delays caused by network communication can thus be minimized, as well as budgetary constraints imposed on the divisions or departments. Aside from this issue of delegation, the license management facility may best be operated on a network, where the licensing of products run on all nodes of the network may be centrally administered. A network is not necessary for use of the features of the invention however, since the license management can be implemented on a single platform.

Software products are increasingly fragmented into specific functions, and separate distribution of the functions can be unduly expensive. For example, a spreadsheet program may have separate modules for advanced color graphics, for accessing a database, for printing or displaying an expanded list of fonts, etc. Customers of the basic spreadsheet product may want some, none or all of these added features. Yet, it would be advantageous to distribute the entire combination as one package, then allow the customer to license the features separately, in various combinations, or under differing terms. The customer may have an entire department of the company needing to use the spreadsheet every day, but only a few people who need to use the graphics a few days a month. It is advantageous, therefore, to provide alternatives for varied licensing of parts or features of software packages, rather than a fixed policy for the whole package.

Another example of distribution of products in their entirety, but licensing in parts, would be that of delivering CD ROMs to a customer containing all of the software that is available for a system, then licensing only those parts the customer needs or wishes to pay fees for rights to use. Of course, the product need not be merely applications programs, operating systems, or traditional executable code, but instead could also include static objects such as printer fonts, for example, or graphics images, or even music or other sound effects.

As will be explained below, calling and caller authorizations are provided in the system according to one feature of the invention, in order to provide technological support for a number of business practices and solve technical problems which require the use of what is called "transitive licensing." By "transitive licensing" is meant that the right to use one product or feature implies a right to use one or more other products or features. Transitive licenses are similar to group licenses in that both types of license consist of a single instrument providing rights of use for a plurality of products. However, transitive licenses differ from group licenses in that they restrict the granted rights by specifying that the licensed products can only be used together and by further specifying one or more permitted inter-product calling/caller relationships. Some examples may help to clarify the use and nature of a transitive license: the examples to be explained are (1) two products sold together, (2) a give-away that results from narrow choices of licensing alternatives, (3) a client licensing method in a client/server environment, (4) impact of modular design, and (5) the impact of distributed design.

A software vendor might have two products for sale: the first a mail system, and the second a LEXIS™-like content-based text retrieval system. Each of these products might be valued at $500 if purchased separately. Some customers would be satisfied by purchasing the rights to use only one of these products. others might find that they can justify use of both. In order to increase the likelihood that customers will, in fact, purchase both products, it would not be surprising if the software vendor offered his potential customers a volume discount, offering the two products for a combined price of $800. The customers who took advantage of this combined offer would find that they had received two products, each of which could be exploited to its fullest capabilities independently from the other. Thus, these customers would be able to use the content based retrieval system to store and retrieve non-mail documents. However, from time to time, the vendor may discover that particularly heavy users of mail wish to be able to use the content based retrieval system only to augment the filing capabilities provided by the standard mail offering. It is likely that many of these potential customers would feel that $800 is simply too much to pay for an extended mail capability. The vendor might then consider offering these customers a license that grants mail users the right to use the content-based retrieval system only when they are using mail and prohibits the use of content based retrieval with any other application that might be available on the customers system. This type of license is referred to below a "transitive license," and it might sell for $600.

Another example is a relational database product (such as that referred to as Rdb™) designed for use on a particular operating system, e.g., VMS. This relational database product has two components: (1) A user interface used in developing new databases, and (2) a "run-time" system which supports the use of previously developed databases. The developers of the database product might spend quite a bit of effort trying to get other products made by the vendor of the database product to use it as a database instead of having those other products build their own product-specific databases. Unfortunately, the other product designers may complain that the cost of a run-time license for the database product, when added to the cost of licenses for their products, would inevitably make their products uncompetitive. Thus, some mechanism would be needed that would allow one or another of the vendor's products to use the run-time system for the relational database product in a "private" manner while not giving unlicensed access to products of other vendors. No such mechanism existed, prior to this invention; thus, the vendor might be forced to sell the right to use its run-time system for the database product with its proprietary operating system license. Clearly, this combined license would make it possible for the vendor's products to use its database product without increasing their prices; however, it also would make it possible for any customers and third-parties to use the database product without paying additional license fees. However, had the system of the invention been available, the vendor could have granted transitive licenses for the run-time component of its database product to all the vendor's products. Essentially, these licenses would have said that the database run-time could be used without an additional license fee if and only if it was used in conjunction with some other of the vendor's products. Any customer wishing to build a new relational database application or use a third-party application that relied on the vendor's database product would have had to pay the vendor for its database run-time license.

A proposed client/server licensing method provides yet another example of a problem which could be solved by transitive licensing. Typically, a client is only used by one user at a time, while a server can support an arbitrary number of clients depending on the level of client activity and the capacity of the machine which is supporting the server. While traditionally, server/client applications have been licensed according to the number of clients that a server could potentially support, this may not be the most appropriate method for licensing when the alternatives afforded by the invention are considered. The business model for the proposed client/server method requires that each client be individually licensed and no explicit licensing of servers is required to support properly licensed clients. Such a licensing scheme makes it possible to charge customers only for the specific number of clients they purchase. Additionally, it means that a single client can make use of more than one server without increasing the total cost of the system. The solution to this transitive licensing problem would be to provide a mechanism that would allow the clients to obtain license unit allocations and then pass a "proof" of that allocation to any servers they may wish to use. Servers would then support any clients whose proofs could be verified to be valid. On the other hand, if a client that had not received a proof of allocation attempted to use a server, the server would obtain a license allocation for that client session prior to performing any services. Such a solution has not been heretofore available.

As the complexity and size of the software systems provided to customers increases, it is found that the actual solution provided to customers is no longer a single product. Rather, customers are more often now offered solutions which are built up by integrating an increasing number of components or products, each of which can often stand alone or can be part of a large number of other solutions. In fact, a product strategy may rely almost exclusively on the vendor's engineering and selling a broad range of specialized components that can only be fully exploited when combined together with other components into a larger system. Such components include the relational database runtime system mentioned above, mail transport mechanisms, hyperinformation databases, document format conversion services, time services, etc. Because these components are not sold on their own merits, but rather on their ability to contribute to some larger system, it is unlikely that any one customer will be receiving the full abstract economic value of any one of the components once integrated into a system. Similarly, it can be observed that the value of any component once integrated into a larger system varies greatly from system to system. Thus, it may be found that a mail transport mechanism contributes a large part of a system whose primary focus is mail, however, it will contribute proportionally less of the value of a system that provides a broader office automation capability. As a result of these observations, the job of the business analyst who is attempting to find the "correct" market price for each component standing on its own, is more complex. In reality, the price or value of the component can only be determined when considering the contribution of that component to the full system or solution in which it is integrated. Attempting to sell the components at prices based on their abstract, independent values will simply result in overpriced systems.

Transitive license styles are particularly suited to dealing with pricing of modular components, since component prices can be clearly defined in relation to the other components or systems which they support. Thus, a vendor can charge a price of $100 for the right to use a mail transport system in conjunction with one product, yet charge $200 for the use of the same mail transport system when used by another product.

In addition to the "business" reasons for wanting to support transitive licensing, there is also a very good technical reason that arises from the growing tendency of developers to build "distributed products" as well as the drive toward application designs that exploit either tightly or loosely coupled multiprocessor systems; the availability and growing use of remote procedure calls has contributed to this tendency. This technical problem can be seen to arise when considering a product which has a number of components, each of which may run in a different process space and potentially on a different computer system. Thus, there might be a mail system whose user interface runs on one machine, its "file cabinet" is supported by a second machine and its mail transport system runs on yet a third machine. The simple question which arises is: "Which of the three components should check for licenses?" Clearly it must be ensured that no single component can be used if a valid license is not present. Thus, the answer to the question will probably be that all three components should check for licenses. However, the question is then presented: "Where are the licenses to be located?". This can become more complex.

Increasingly, the distributed systems being built are being designed so that it is difficult to predict on which precise machine any particular component will run. Ideally, networks are supposed to optimize the placement of functions automatically so that the machine with the most available resource is always the one that services any particular request. This dynamic method of configuring the distribution of function servers on the network makes it very difficult for a system or network manager to predict which machines will run any particular function and thus very difficult for him to decide on which machines software licenses should be loaded.

Even if a system manager could predict which machines would be running the various application components and thus where the license units should be loaded, the situation would still be less than ideal. The problem arises from the fact that each of the components of the application would be independently making requests for license unit allocations. This behavior will result in a difficult problem for anyone trying to decide how many license units are required to support any one product. Given the mail example, the problem wouldn't exist if it were assumed that all three components (i.e., user interface, file cabinet, and transport system) were required by the design of the mail system to be in use simultaneously. If this were the case, it could be simply assumed that supporting a single activation of the mail system would require three units. However, in a real mail system, it will be inevitably discovered that many users will only be using just the user-interface and file-cabinet components of the system at one time. Thus, there will be some unused units available which could be used to authorize additional users. This situation might not be what is desired by the software vendor.

The problem of providing license support to multi-component products which are dynamically configured could be solved by viewing each of the product components as a distinct licensable product and by treating the problem as one of transitive licensing, but a mechanism for accomplishing this has not been available. Essentially, a single license document would be created that stated that if any one of the components had successfully obtained a license to run, it could use this grant to give it the right to exploit the other components. Thus, in the example above, the user might start the mail system by invoking its user interface. This user interface code would then query the license management facility for a license allocation and once it has received that allocation, it would pass a proof of allocation to the other mail components that it uses. Each of the other components would request that the license management system validate that the "proof" is valid prior to performing any service; however, none of the other components would actually require specific allocations to be made to them. In this way, the complexity of licensing and managing networks of distributed applications can be significantly reduced.

SUMMARY OF THE INVENTION

In accordance with one embodiment of the invention, a license management system is used to account for software product usage in a computer system. The system employs a license management method which establishes a management policy having a variety of simultaneously-available alternative styles and contexts. A license server administers the license, and each licensed product upon start-up makes a call to the license server to check on whether usage is permitted, in a manner similar to that of U.S. Pat. No. 4,937,863. The license server maintains a store of the licenses, called product use authorizations, that it administers. Upon receiving a call from a user, the license server checks the product use authorization to determine if the particular use requested is permitted, and, if so, returns a grant to the requesting user node. The license server maintains a database of product use authorizations for the licensed products, and accesses this database for updating and when a request is received from a user. While this license management system is perhaps of most utility on a distributed computer system using a local area network, it is also operable in a stand-alone or cluster type of system. In a distributed system, a license server executes on a server node and the products for which licenses are administered are on client nodes. However, the license management functions and the licensed products may be executing on the same processor in some embodiments.

The product use authorization is structured to define a license management policy allowing a variety of license alternatives by components called "style", "context", "duration" and "usage requirements determination method". The style may be allocative or consumptive. An allocative style means the units of the license may be allocated temporarily to a user when a request is received, then returned to the pool when the user is finished, so the units may be reused when another user makes a request. A consumptive style means the units are deducted from an available pool when a user node makes a valid request, and "consumed", not to be returned for reuse. The context value defines the context in which the use is to be allowed, such as on a particular network, by a particular type of CPU, by a particular user name, by a particular process, etc. The duration value (used in conjunction with the style component) concerns the time when the license units are to be deducted from the available pool of units, whether at the time of request, after a use is completed, etc. A usage requirements determination method may be specified to define or provide information concerning the number of license units charged in response to a license request from a user node; for example, some CPU platforms may be charged a larger number of license units than others. A table may be maintained of usage requirements, and the determination method may specify how to access the table, for example. The important point is that the user node (thus the software product) can only make a request, identifying itself by user, platform, process, etc., and the license management facility calculates whether or not the license can be granted (that is, units are available for allocation), without the user node having access to any of the license data or calculation. There is a central facility, the license server, storing the license documents, and, upon request, telling the licensed products whether they can operate under the license terms.

An important feature of one embodiment is that the license administration may be delegated to a subsection of the organization, by creating another license management facility duplicating the main facility. For example, some of the units granted in the product use authorization may be delegated to another server, where the user nodes serviced by this server make requests and receive grants.

The license management facility cannot create a license itself, but instead must receive a license document (a product use authorization) from an issuer of licenses. As part of the overall license management system of the invention, a license document generator is provided which creates the product use authorizations under authority of the owner of the software, as negotiated with customers. Thus, there are three distinct rights in the overall license management facility of the invention: (1) the right to issue licenses, (2) the right to manage licenses, and (3) the right to use the licensed products. Each one of these uses the license document only in prescribed ways. The license issuer can generate a license document. The license manager (or license server as referred to herein) can grant products the right to use under the license, and can delegate parts of the licensed units for management by another server, as defined by the license document; the way of granting rights to products is by responding to certain defined calls from the products. And, the licensed products can make certain calls to the license server to obtain grants of rights based upon the license document, inquire, or report, but ordinarily cannot access the document itself.

As explained above, transitive licensing is an important feature of one embodiment. This is the provision of a mechanism for one user node to get permission to use another software product located on another user node; this is referred to as a calling authorization and a caller authorization, using a "calling card," and these are examples of the optional features which must be specifically permitted by the product use authorization. A user node must obtain permission to make a procedure call to use a program on another node; this permission is obtained by a request to the license server as before, and the permission takes the form of a calling card. When a calling card is received by a second node (i.e., when the procedure call is made), a request is made by the second node to the license server to verify (via the product use authorization) that the calling card is valid, and a grant sent to the user node if allowed. In this manner, all nodes may have use of a program by remote calls, but only one consumes license units.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 1 is a diagram in block form of a distributed computer system which may be used to implement the license management operations according to one embodiment of the invention;

FIG. 2 is a diagram of the content of a license document or "product use authorization" generated by the license document generator and stored by the license server in the system of FIG. 1;

FIG. 3 is a diagram of the alternatives for license style, context and duration making up the license management policy implemented in the system of FIG. 1, according to one embodiment of the invention;

FIG. 4 is a diagram of an example of a fragment of a license use requirements table (LURT) used in the system of FIG. 1, according to one embodiment of the invention;

DETAILED DESCRIPTION OF SPECIFIC EMBODIMENTS

Figure 5:
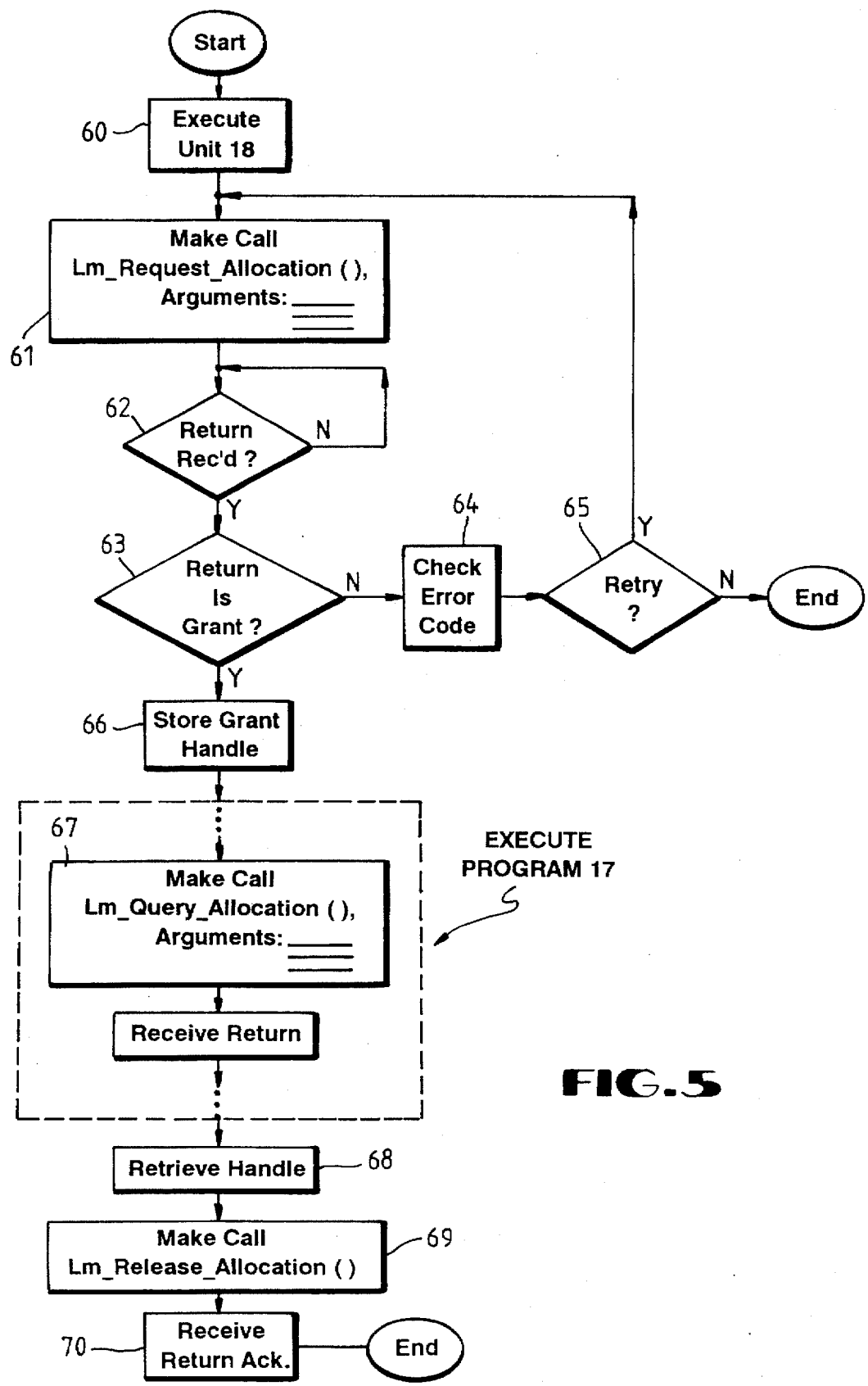
FIG. 5 is a logic flow chart of a program executed by a user node (client), in the system of FIG. 1, according to one embodiment of the invention.

Referring to FIG. 1, a license management facility according to one example embodiment of the invention is centered around a license server 10, which typically includes a CPU located in the customer's main office and executing a license management program 11 as will be described, under an operating system 12. The license server 10 communicates with a number of delegatees 13 which likewise include CPUs in departments or divisions of the company or organization, each also executing a license management program 14 under an operating system 15. The license management program 14 is the same as the program 11 executing on the main server 10; the only difference in the functions of server 10 and servers 13 is that the latter have a delegated subset of the license units granted to the server 10, as will be described. The CPUs 13 are in turn servers for a number of users 16, which are CPU nodes where the licensed programs 17 are actually executed. The programs 17 executing on the user CPUs 16 are applications programs (or operating systems, etc.) which have added to them units 18 and 19, according to the invention, allowing them to make inquiry to the their server 13 (or 10) before executing and to report back after executing, using a client stub 19 in the manner of remote procedure calls, in one embodiment. A user node 16 may have many different programs 17 that may be executed, and the various user nodes 16 would usually each have a set of programs 17 different from the other user nodes, all of which would be administered by the license management program 14 or 11. The terms "program" and "licensed product" are used in reference to the element 17, but it is understood that the products being administered may be segments of programs, or functions or features called by another program, or even merely data (such as printer fonts), as well as complete stand-alone applications programs. The license server 10 communicates with the delegatee servers 13 by a network 21, as is usual in large organizations, and the delegatee servers 13 each communicate with their user nodes 16 by networks 22; these networks may be of the Ethernet, token ring, FDDI types or the like, or alternatively, the user nodes 16 may be merely a cluster of terminals on a multiuser system with the delegatee being a host CPU The particular hardware construction of the user nodes, server nodes, communication networks, etc., and the operating systems 12 or 15, are of no concern regarding the utility of the features of the invention, the only important point being that the user CPUs 16 of the software products 17 in question can communicate readily and quickly with their respective server nodes 13 or 10. In one embodiment, remote procedure calls (RPCs) are used as the communication medium for the interfaces between components of the system, handling the inquiries and grants as will be described. A remote procedure call is similar to a local procedure call but is made to a procedure located on a remote node, by way of a communications network.

The function of the unit 19 is that of a client stub, in a remote procedure call sense. The calls to the license server 10 are made through this stub 19, and returns are received by the stub 19 and passed on to the program 17. The stub 19 is responsible for obtaining the network addresses of other nodes on the network, such as the server 10. Also, the stub 19 is responsible for determining the context (as defined below) for passing on to the server 10. The unit 18 functions to execute a "private" type of license availability determination if this is used, rather than this task being done by the application program 17, but if the ordinary method of determination is employed (using the license server) as is usually the case, the unit 18 is merely code that starts the execution and passes calls and returns back and forth between the program 17 and the unit 19.

The license server 10, using the license management program 11, maintains a license data file 23 comprising a number of license documents or licenses (product use authorizations), and also maintains a log 24 which is a record of the usage activity of all of the user CPUs 16 of each of the licensed programs. The delegatee servers 13 would maintain similar license databases and logs. The license server 10 has no authority to originate a license, but instead must receive a license from a license issuer 25. The issuer 25 is again a CPU executing a license document generator program 26 under an operating system 27. The license issuer 25 may be under control of the producer 28 of the programs or software products being licensed, or may be controlled by a distributor who has received the authority to grant licenses from the producer or owner 28. The communications link 30 between the license issuer 25 and the license server 10 for delivering the license document may be in the form of a network, or may be a phone line using modems, or may include physical delivery by disks or CD ROMs, for example. Likewise, the method of delivery of the software products being licensed, i.e., the applications programs 17 to be executed on the CPUs 16, is not material to the license management facility of the invention; the products are delivered by some appropriate means, e.g., the communications link 30 and the networks 21 and 22, by CD ROMs or disks physically distributed, etc.

Although shown in FIG. 1 as operating on a distributed system, in the simplest case the license management facility of the invention may be operated on a single CPU. The license management program 11 and the applications program 17 may be executing on the same CPU, in which case the license document would be stored in a database 23 as before, on this CPU, and the calls from the unit 18 to the license server would be local instead of RPCs. As in the distributed system, however, the licensed product would still not have access to the license document, but instead could only make inquires to the server program, even if all are executing on the same CPU.

In operation of the distributed system of FIG. 1, the producer 28 gives the issuer 25 authority to grant licenses on its behalf (the producer and issuer can be a single entity or multiple entities). The license document generator program 26, under control of a user (a person), generates a license (usually the result of negotiation between the user of program 26 and a user of the server 10). This license is called a product use authorization, and it is transmitted by the link 30 to the server 10. The license management program in the server 10 stores the product use authorization in the database 23, and, if delegation is an authorized option, may distribute parts of the authorized use to the delegatee servers 13, where it is likewise stored in a database. Thereafter, administration of the license is only in response to inquiries from user nodes 16. When execution of a program 17 begins, the unit 18 is invoked to check on the availability of a license for this particular node. The unit 18 sends (as by an RPC) a request to the license management program 14 (or 11 if there is no delegatee), where the product use authorization stored in database 23 is checked to see if use is authorized. If so, a return is sent to the user node 16, granting permission to continue. When the program 17 has finished executing, the unit 18 again is invoked to signal to the license management program, again by an RPC, that the authorization is released, so the license management program can take appropriate action, e.g., log the use in log 24, etc.

To implement these operations, the license management program 11 or 14 contains several functions, including a client interface 31, a database interface 32, a management interface 33, and an interserver interface 34 for communicating with the delegatees 13 (if any). The client interface 31, as described below, handles the requests received from the user nodes 16, and returns resulting from these requests. The database interface 32 handles the storing and retrieval of license information in the database 23, and logging license usage activity to log 24, and retrieval of this data. The management interface 33 handles the tasks of receiving the product use authorizations from the issuer 25 and maintaining the database 23 via the database interface 32. The interserver interface 34 handles the task of communicating with the delegatee servers 13, including transmitting the assigned parts of the product use authorizations, or communicating with other license servers that may be separately executing the license management function; for example, calls for validating calling cards may be made to another such server. If there are no delegatees or no other license servers, then of course the interserver interface 34 has no function, and is idle.

The license document or "product use authorization" forming the basis for the license management activity of the program 11 on the server 10 may be illustrated as a data structure containing the information set forth in FIG. 2; in actual practice the product use authorization is preferably a more abstract data arrangement, not in such a rigidly structured format as illustrated. For example, the product use authorization as well as similar documents stored in the database 23, or passed between components of the system of FIG. 1, may be of the so-called tag-length-value data format, where the data structure begins with an identifying tag (e.g., PUA or product use authorization) followed by a field giving the length, followed by the value itself (the content). One type of data treatment using this tag-length-value format is an international standard referred to as ASN.1 or Abstract Syntax Notation. In any event, the document 35 illustrated in FIG. 2 is merely for discussing the various items of data, rather than representing the way the information is stored. Some of the fields shown here exist at some times and not others, and some are optional; the product use authorization may also include additional fields not shown or discussed here. Also it should be noted that copies of parts of this type of document are made for the delegatees, so this representation of FIG. 2 is a composite of several documents used in the system of FIG. 1. The document 35 includes fields 36 identifying the software product by product name, producer, version numbers, release date, etc. The issuer 25 is identified in field 37, and the licensee (usually the owner of the license server 10) identified in field 38. The essential terms of the license grant are then defined in fields 40–46. The start date and end date are specified in fields 40; these store the exact time (date, hour, minute, second, etc.) when the license becomes valid and when it ends, so licenses may be granted to start at some future time and to end at a particular time. Note that the previous practice has been to specify only the ending date, rather than also a start date as employed here. Each of the nodes, including issuer 25, servers 10 and 13, and user nodes 16, maintain a time value by a local clock referenced to a standard, so inherent in the license management facility is the maintaining of a time standard to compare with the start and end date information in the fields 40. The units granted are specified in field 41; the units are an arbitrary quantitative measure of program usage. In a delegatee server 13, the units field 41 will have some subset of the units field in the original product use authorization. As units are granted to users 16 or delegated, the remaining units available for grant are indicated in a subfield 42 in the copy of the document used by the server. The management policy occupies fields 43–46, and includes style, context, duration and LURDM (license use requirements determination method), as will be explained. The style field 43 specifies whether the licensed units are controlled by an "allocative" style or "consumptive" style, or some other "private" algorithm, where styles are ways used to account for the consumption or allocation of the units. The context field 44 specifies the location and environment in which product use or license management occurs, i.e., a CPU or an individual user or a network, etc. Duration field 45 indicates whether the license granted to a user is by assignment, by transaction, or immediate. The LURDM field 46 indicates the license use requirements determination method, in some cases using a license use requirements table (LURT) seen as field 47, as will be described.

Additional fields 48–54 in the product use authorization 35 of FIG. 2 define features such as delegation authorization, calling authorization, overdraft authorization, combination authorization, token, signature, checksum, etc. These will be described in the following paragraphs.

If the delegation field 48 is true, a license server 10 may distribute license units to multiple servers 13. A time limit may be imposed, i.e., units can be delegated to other hardware systems until they time out. Delegation allows an administrator to distribute units to improve response time and increase the resilience of the system. For example, the communication network 21 may include a satellite link to a remote facility where the local server 13 has a number of clients or users 16, in which case the calls to the server 13 would be completed much quicker than would be the case if calls had to be made to the server 10. Also, delegation may be used as a method of allocating licensed units within a budget for administrative purposes. Usually the delegation authorization is a feature that is priced by the issuer, i.e., a license granting 1000 units with delegation authorization is priced higher than without this authorization.

The field 49 contains a calling authorization and/or a caller authorization. If the caller authorization in field 49 is true, the product is permitted to receive calls from other named products requesting use of the product, and if conditions are met (identified caller is authorized) the server can grant authorization to use such product, as described below. The process of granting such authorization uses a "calling card" metaphor, and such authorization will be referred to as "calling card" for simplicity. If the calling authorization is true, the product can make calls to other products. If neither is true, then the product can neither make or receive calls using the calling card feature. Referring to FIG. 1, if product 17a wishes to make a remote procedure call to a feature of product 17b running on a different user node 16, it makes a call to its server 13 including a request for a calling card, and, if permitted, the return to product 17a includes a calling card 49a. The product 17a then makes a call to product 17b in the usual manner of RPCs, sending along the calling card 49a, which the product 17b then verifies by a call to its server 13 before executing the called procedure and issuing its return to product 17a. The feature of calling cards is important for distributed applications. For example, if a product is able to execute faster in a distributed system by assigning tasks to other CPUs, then the issue is presented of which license policy is needed, i.e., does every node executing a part of the task have to be licensed and consume or receive allocation of a unit, or just the one managing the task? This is resolved for most applications by use of this calling card concept. The product use authorization for such a product has the calling authorization field 49 enabled, so calling cards can be issued. This feature is typically separately priced.

The combination authorization field 50 of FIG. 2 determines whether or not license requests from a user node 16 can be satisfied by combining units from multiple product use authorizations. It may be advantageous to purchase licenses with different policy values, and use units from certain product use authorizations only for overflow or the like. Or, for other reasons, it may be advantageous to "borrow" and "lend" units among delegated servers or user nodes. This function is permitted or denied by the content of field 50.

The overdraft field 51 determines whether or not a requested allocation from a user node 16 will be nevertheless granted, even though the units available field 42 is zero or too small to permit the requested use. Overdrafts can be unlimited, or a specific overdraft pool can be set up by a server 10, for a customers internal administrative purposes. That is, the overdraft value may be unlimited in the original license, but limited or zero for internally distributed copies of the license. Thus, the product use authorization sent by the issuer 25 to the customer may have overdrafts permitted by the field 51, but the customer may deny overdraft permission for its own budgeting purposes. In any event, if overdraft is permitted, additional fees have to be paid to the issuer at some accounting period, when the logged usage from log 24 indicates the available units have been exceeded. If overdraft is denied, then the units 18 of the user nodes making request allocations are structured to inform the products 17 that a license grant is not available. The intent is not to prevent the application program from running; the license server merely informs the application whether or not the license manager determines that it is authorized to run. The application can itself be structured to shut itself down if not authorized to run, or it can be structured to shut down certain functions (e.g., ability to save files, ability to print, etc.), or it can be structured to continue in a fully functional manner. The purpose of the license management facility is not that of enforcement, nor that of "copy protection", but instead is merely that of license management.

An optional token field 52 is available in the product use authorization 35 of FIG. 2. This field can contain comments or other information desired by the issuer or user. For example, a telephone support number may be included in the token field, then when the product 17 shows its "help screen" the number is inserted. This number would be part of the argument, i.e., data transmitted to the user node 16, when the server 10 makes a return following a request allocation message from the user. This field may also be used to store information used in a "private" style, where the information from this field returned to the user node is employed by the application program 17 or the stub 19 to determine if the application can be activated.

The signature field 53 in the product use authorization 35 is a part of a validation mechanism which provides important features. This field contains a digital signature encoded to reflect the data in the license itself, as well as other encoding methods not known to customers, so it cannot be duplicated unless the encoding algorithm is known. In a preferred embodiment, a so-called "public/private key" system of encoding is used for the signature field 53. The encoding algorithm used to generate the signature 53 is known to the issuer 25, using a private key, and anyone knowing the public key can decode the signature to determine if it is valid but cannot determine the encoding algorithm so it cannot produce a forged signature. So, if the server 10 knows the public key which is unique to the issuer 25, it can determine if a license document 35 is genuine, but it cannot itself generate license documents. However, if the server possesses a valid license document that gives it the right to delegate, then it will be assigned its own private key (different from all other issuers or servers) and its delegatees 13 will be able to determine if a valid delegated license is delivered to them as they will be given the public key for the servers 13. The field 53 will thus contain both the original signature from the issuer 25 and the license server's signature when delivered to a delegatee 13. The decoding algorithm using a public key for any signatures is thus used by the license server 10 or delegatee 13 to make sure a product use authorization 35 is authentic before it is stored in the database 23. Related to the digital signature 53 is a checksum field 54, which merely encodes a value related by some known algorithm to the data in the product use authorization 35 itself. This field may be used merely to check for corruption of the data as it is stored, recalled, and transmitted within the system. That is, the checksum is used for data validation rather than security.

Two concepts central to the license management system implemented using the license document or product use authorization 35 of FIG. 2 are the "license units", specified in field 41 or 42 and the "context", specified in field 44. License units are an abstract numerical measure of product use allowed by the license. When a product 17 (or a function or feature of a product) makes a license-checking request, the license management program 11 on server 10 computes how many license units are required to authorize this particular use of the product, and this is the license units requirement, in some cases using the LURDM field 46. A "context" is a set of tagged values which define the location and environment in which product use or license management occurs. Context values may be specified in field 44 of the product use authorization 35 of FIG. 2 to restrict the environments in which the license may be managed and in which product use may occur. A context template may also be specified in the field 44 to indicate which parts of the complete context of product use (sub-contexts) are significant in differentiating product uses for the purposes of unit allocation; when this is specified, it allows separate product uses to share license units in a controlled way.

The two general types of policies specified in field 43 are allocative and consumptive. An allocative policy grants to the holder a specific number of license units (field 41) and specifies the policy which must be used to account for the allocation of these units. A software product 17 which is being managed by an allocative license will require verification that the appropriate number of license units have been allocated to it prior to performing services to the user. Typically, this allocation of units occurs either at the time of activation of the product 17 or at the time that product use is enabled on a particular platform (user CPU 16). The units typically remain allocated to the product 17 throughout the period that the product is running or is enabled to run. Upon termination of processing or disabling, the allocated units are deallocated and made available for allocation to other instances of the software product 17 (other users 16 activating the product). In general, as long as any license units remain unallocated in field 42, the holder of the license is contractually authorized to increase his utilization of the licensed product. The usage does not deplete the license, however, as the units are returned to the units-available field 42 after a user is finished, and can be granted again to another user.

A consumptive unit based license, indicated in policy field 43, grants to the holder a specific number of initial license units (from field 42) and specifies the policy used to account for the consumption of those units. A software product 17 which is being managed by a consumptive license will cause an appropriate number of license units to be consumed to reflect the services provided by the product. Once consumed, units cannot be reused. Thus, the number of units available for future use declines upon every use of the licensed software product 17. This may also be referred to as a "metered" policy, being conceptually similar to measured consumption of electricity, water, etc. When the number of available units in field 42 reaches zero, the license may require that further use of the product is prohibited, or, the agreement may permit continued decrementing of the number of available units; the result is the accumulation of a negative number of available units in the field 42. It is anticipated that most consumptive unit based licenses will consider negative units to represent an obligation of the license holder to pay the license issuer 25. The transaction log 24 maintains an audit trail for providing a record of the units used in a consumptive license.

Referring to FIG. 3, the major elements of the management policy are set forth in a table, where the possible entries for the fields 43, 44, 45 and 46 are listed. For the style entry 43, the possibilities are allocative and consumptive as just described, plus a category called "private" which represents a style of management undefined at present but instead to be created especially for a given product, using its own unique algorithm. It is expected that most licenses may be administered using the named alternatives of FIG. 3, but to allow for future expansion to include alternatives not presently envisioned, or to permit special circumstances for unique software, the "private" choices are included, which merely mean that the product 17 will generate its own conditions of use. It is important to note that, except for the "private" alternative, the license management is totally in control of the license management program 11 on the license server 10 (or delegatee 13), rather than at the product 17. All the product 17 does, via the unit 18, is to make the request inquiry to the server 10 via the client interface 31, and report when finished.

The context field 44 specifies those components (sub-contexts) of the execution-context name which should be used in determining if unit allocations are required. License data is always used or allocated within, or for the benefit of, some named licensing context, and context can include "platform contexts" and "application contexts". Platform contexts are such things as a specific network, an execution domain, a login domain, a node, a process ID or a process family, a user name, a product name, an operating system, a specific hardware platform, as listed in FIG. 3. Applications contexts are information supplied from the application (the product 17), such as may be used in a "private" method of determining license availability. The context name can use several of these, in which case the context name is constructed by concatenating the values of all subcontexts into a single context name, e.g., a VAX 3100 platform using VMS operating system.

The duration field 45 defines the duration of an allocation of license units to a specific context or the duration of the period which defines a valid consumptive use. For durations of type "Assignment," the specification of a reassignment constraint is also provided for, as discussed below. There are three types of duration, these being "transaction," "assignment" and "immediate" as seen in FIG. 3.

The transaction duration type, when specified for an allocative policy, indicates that license units should be allocated to the specified context upon receipt of a license request and that those units should be deallocated and returned to the pool of available units upon receipt of a corresponding license release from a user node 16. Abnormal termination of the process or context having made the original license request will be semantically equivalent to a license release. On the other hand, when specified for a consumptive policy, this duration type indicates that license units should be allocated to the specified context upon receipt of a license request and permanently removed from the available units pool (field 42) upon receipt of a license release which reflects successful completion of the transaction. Upon receipt of a license release which carries an error status or upon abnormal termination of the processor context having made the original license request, the allocated units will be deallocated and returned to the pool of available units (field 42).

The assignment duration type in FIG. 3 (field 45 of FIG. 2) imposes the constraint that the required units must have been previously assigned to a specific context. The subcontexts which must be specified in the assignment are those given in the context-template. A "reassignment constraint" may be imposed, and this is a limitation on how soon a reassignment can be made. For example, a reassignment constraint of 30-days would require that units assigned to a specific context could not be reassigned more often than every 30-days; this would prevent skirting the intent of the license by merely reassigning units whenever a user of another context made a request allocation call for the product. Related to this assignment constraint, a "reallocation limit" may also be imposed, to state the minimum duration of an allocation; where there is a context template of process, the intent is to count the number of uses of the software product at a given time, but where software runs in batch rather than interactive mode it may run very quickly on a powerful machine, so a very few concurrent uses may permit almost unlimited usage—by imposing a reallocation constraint of some time period, this manner of skirting the intent of the license may be constrained.

The immediate duration type (field 45 of FIG. 2) is used to indicate that the allocation or consumption of an appropriate number of license units from the pool of available units (field 42) should be performed immediately upon receipt of a license request. Receipt of license release or abnormal terminations will then have no impact on the license management system. When specified as the duration for an allocative policy, the effect will be simply to check if an appropriate number of license units are available at the time of a license request. When specified as the duration for a consumptive policy, the effect will be to deduct the appropriate number of license units from the available pool at the time of a license request, and, thereafter, abnormal termination, such as a fault at the user CPU 16 or failure of the network link, will not reinstate the units.

The LURDM or license unit requirement determination method, field 46, has the alternatives seen in FIG. 3 and stores information used in calculating the number of units that should be allocated or consumed in response to a license request. If this field specifies a table lookup kind, this means license unit requirements are to be determined by lookup in the LURT (field 47) which is associated with the current license. If a constant kind is specified, this indicates that the license units requirements are constant for all contexts on which the licensed product or product feature may run. A private LURDM specifies that the license unit requirements are to be determined by the licensed product 17, not by the license management facility 11. The license unit requirements tables (LURTs) provide a means by which issuers of licenses can store information describing the relation between context (or row selector) and unit requirements. The license units requirements determination method (LURDM) must specify "table lookup" for the LURT to be used, and if so a row selector must be specified, where a valid row selector is any subcontext, e.g., platform ID, user name, time of day, etc. An example of an LURT fragment is shown in FIG. 4, illustrating the license unit requirements table mechanism. In this example, the row selector is "platform-ID" so the platform-ID value determines which row is used. The issuer of this LURT of FIG. 4 has established three unit requirement tiers for use in determining the unit requirements for that issuer's products. The reason for the tiers is not mandated by the license management system, but the issuer 25 (actually the user of the program 26) would probably be establishing three pricing tiers, each reflecting a different perspective on the relative utility of different platforms in supporting the use of various classes of product 17. The first column in FIG. 4, Column A, specifies the use requirements for a class of products whose utility is highly sensitive to the characteristics of the specific platform on which they are run. This can be seen by observing that the unit requirements are different for every row in Column A. Products which use the second column (Column B) appear to have a utility which is more related to the class of platform on which they run. This is indicated by the fact that all the PC platforms share a single value which is different from that assigned to the VAX platform. The final column (Column C) is for use with a class of products which is only supported on the VAX platform. FIG. 4 is of course merely an example, and the actual LURT created by the license document generator 26 and stored S in the license database 23 (as field 47 of the product use authorization 35) can be of any content of this general format, as desired by the license issuer.

Instead of always selecting the rows in LURT tables according to the platform ID of the execution platform, in order to handle the breadth of business practices that need to be supported by the license management facility, the LURT mechanism is extended by providing a "row selector" attribute in the LURT class structure. No default is provided although it is expected that the normal value for the row selector attribute will be "platform ID."

In the system of U.S. Pat. No. 4,937,863, a concept similar to that of the LURT of FIG. 4 was provided, with rows selected by the platform ID and columns selected by some arbitrary means, typically according to product type. The system of this invention allows flexibility in the selection of both LURT row and column while continuing to provide backwards compatibility for licenses defined within the constraints of U.S. Pat. No. 4,937,863.

Some examples will illustrate potential uses for the row selector attribute. A customer may only want to pay for the use of a product during one or two months of the year; the product may be FORTRAN and the reason for this request may be that the company has a fairly stable set of FORTRAN subroutines that are given regular "annual maintenance" only during the months of May and June. To handle this customer's needs, the FORTRAN product would generate an application subcontext which would contain a value representing the month of the year. Then, a LURT table would be defined with twelve rows, one for each month of the year. In some column, probably column A, a negative one (−1) would be placed in each month except for May and June. These two months would contain some positive number. The product use authorization would then have a LURDM field specifying a LURT for use to determine the units requirement, and would name this custom LURT table. The effect would be that the PUA could only be used during the months of May and June since negative one is interpreted by license managers to mean "use not authorized." This mechanism could also be used to do "time of day" charging. Perhaps charging fewer units per use at night than during the day. Also, if a subcontext was used that contained a year value, a type of license would be provided that varied in its unit requirements as time passed. For instance, it might start by costing 10-units per use in 1991 but then cost one unit less every year as time passed, eventually getting to the point where the unit requirement was zero.

Another example is font names. A specific customer may purchase a license giving it the right to concurrent use of 100-units of a large font collection; some of the fonts may cost more to use than others. For instance, Times Roman might cost 10-units per use while New Century Schoolbook costs 20-units per use. The problem is, of course, making sure that charges are properly made. The solution is to build a LURT table with a specified application subcontext as its row selector. A row is then created for each font in the collection and in Column A of the LURT, the number of units required to pay for use of the font would be specified. The print server would then specify the name of a font as the value of the application subcontext whenever it does an lm_request_allocation call. This will allow charges to be varied according to font name.

A further example is memory size. Some products are more or less valuable depending on the size of memory available to support them. A software vendor wishing to determine unit requirements based on memory size will be able to do so by building LURT tables with rows for each reasonable increment of memory (probably 1-megabyte increments). Their applications would then sense memory size (using some mechanism not part of the license management facility) and pass a rounded memory size value to the license manager in a private context.

Other examples are environment and operating system. Some products may be valued differently depending on whether they are being run in an interactive mode or in batch. This can be accomplished by building LURT rows for each of the standard platform subcontexts that specify environment. Regarding operating system, it has been considered desirable by many to have a single product use authorization permit the use of a product on any number of operating systems, this conflicts with some vendors policies who do not want to have to create a single price for a product that applies to all operating systems. Thus, if an operating system independent license were offered for a C compiler, the price would be the same on MS-DOS, VMS, and/or UNIX. Clearly, it can be argued that the value of many products is, in part, dependent on the operating system that supports them. By using a row selector of operating system (one of the standard platform subcontexts), license designers could, in fact, require different numbers of units for each operating system. However, it might be more desirable to base the row selection on a private application subcontext that normally had the same value as the operating system subcontext. The reason for this is that the license designer might want to provide a default value for operating system names that were unknown at the time the LURT rows were defined. If this is the case, the product would contain a list of known operating systems and pass the subcontext value of "Unknown" when appropriate. The LURT row for "Unknown" would either contain a negative one (−1) to indicate that this operating system was unsupported or it would contain some default unit requirement.

Another example is variable pricing within a group. One of the problems with a "group" license is that there is only one unit requirements field on the PUA for a group. Thus, all members of the group share a single unit requirement. However, in those cases were all members of the group can be appropriately licensed with a constant unit requirement yet it is desired to charge different amounts for the use of each group member, a LURT can be built that has rows defined for each group member. The row selector for such a group would be the standard platform subcontext "product name."

Many different types of license can be created using different combinations of contexts, duration and policy from the table of FIG. 3. As examples, the following paragraphs show some traditional licensing styles which can be implemented using the appropriate values of the product use authorization fields 43–46.

A "system license" as it is traditionally designated is a license which allows unlimited use of a product on a single hardware system. The correct number of units must be allocated to the processor in advance and then an unlimited product use is available to users of the system. The product use authorization would have in the context field 44 a context template for a node name, the duration field would be "assignment" and the policy style field 43 would be "allocative".

A "concurrent use" license is one that limits the number of simultaneous uses of a licensed product. Concurrent use license units are only allocated when the product is being used and each simultaneous user of the licensed product requires their own units. In this case the context template, field 44, is a process ID, the duration field is "transaction" and the policy style 43 is "allocative".

A "personal use" license is one that limits the number of named users of a licensed product. This style of licensing guarantees the members of a list of users access to a product. Associated with a personal use type of product use authorization there is a list of registered users. The administrator is able to assign these users as required up to the limit imposed by the product use authorization; the number of units assigned to each user is indicated by the LURDM. It may be a constant or it may vary as specified in a LURT. The context template is "user name", the duration is "assignment", and the policy is "allocative".

A "site license" is one that limits the use of a licensed product to a physical site. Here the product use authorization contains for the context template either "network name" or "domain name", the duration is "assignment" and the policy style field 43 is "allocative".

Generally, a license to use a software product is priced according to how much benefit can be gained from using the product, which is related to the capacity of the machine it will run on. A license for unlimited use on a large platform such as a mainframe, where there could be thousands of potential users at terminals, would be priced at a high level. Here the style would be "allocative", the context template ="node", the duration ="assignment" and the LURDM may be "Column A"—the units, however, would be large, e.g., 1000. At the other end of the scale would be a license for use on a single personal computer, where the field values would be the same as for the mainframe except the units would be "1". If a customer wanted to make the product available on the mainframe but yet limit the cost, he could perhaps get a license that would allow only five users at any given time to use the product; here the fields in the product use authorization would be: units=5; style=allocative; context template=process; duration=transaction; LURDM=constant, 1-unit. This would still be priced fairly high since a large number of users may actually use the product if a session of use was short. A lower price would probably be available for a personal use license where only five named persons could use the product, these being identified only in the license server 10, not named by the license issuer 25. Here the fields in the product use authorization are: units=5; style= allocative; context template=user name; duration= transaction; LURDM=constant, 1-unit.

An additional feature that may be provided for in the product use authorization 35 is license combination. Where there are multiple authorizations for a product, license checking requests sent by user nodes 16 may be satisfied by combining units from multiple authorizations. Individual product use authorizations may prohibit combined use. Thus, a licensee may have a license to use a product 17 on an allocative basis for a certain number of units and on a consumptive basis for another number of units (this may be attractive from pricing standpoint); there might not be enough units available for a particular context from one of these licenses, so some units may be "borrowed" from the other license (product use authorization), in which case a combination is made.

The interface between the program executing on the client or user 16 and the license server 10 or its delegatees 13 includes basically three procedure calls: a request allocation, a release allocation and a query allocation. FIG. 5 illustrates in flow chart form some of the events occurring in this client interface. The request allocation is the basic license checking function, a procedure call invoked when a software product 17 is being instantiated, functioning to request an allocation of license units, with the return being a grant or refusal to grant. Note that a product may use request allocation calls at a number of points in executing a program, rather than only upon start-up; for example, a request allocation may be sent when making use of some particular feature such a special graphics package or the like. The release allocation call is invoked when the user no longer needs the allocation, e.g., the task is finished, and this return is often merely an acknowledge; if the style is consumptive, the caller has the opportunity via the release allocation call to influence the number of units consumed, e.g., decrease the number due to some event. The query allocation call is invoked by the user to obtain information about an existing allocation, or to obtain a calling card, as will be described.

The request allocation, referred to as lm_request_ allocation(), is a request that license units be allocated to the current context. This function returns a grant or denial status that can be used by the application programmer to decide whether to permit use of the product or product feature. The status is based on the existence of an appropriate product use authorization and any license management policies which may be associated with that product use authorization. License units will be allocated or consumed, if available, according to the policy statement found on the appropriate product use authorization. The product would normally call this function before use of a licensed product or product feature. The function will not cause the product's execution to be terminated should the request fail. The decision of what to do in case of failure to obtain allocation of license units is up to the programmer. The arguments in a request allocation call are the product name, producer name, version, release date, and request extension. The product name, producer name, version and release date are the name of the software product, name of producer, version number and release date for specifically identifying the product which the user is requesting an allocation be made. The request extension argument is an object describing extended attributes of the request, such as units required, LURT column, private context, and comment. The results sent back to the calling node are a return code, indicating whether the function succeeded and, if not, why not, and a grant handle, returned if the function completes successfully, giving an identifying handle for this grant so it can be referred to in a subsequent release allocation call or query allocation call, for example.

The release allocation, referred to as lm_release_ allocation(), is an indication from a user to the license manager to release or consume units previously allocated. This function releases an allocation grant made in response to a prior call to request allocation. Upon release, the license management style 38 determines whether the units should be returned to the pool of available units or consumed. If the caller had specified a request extension on the earlier call to request allocation which contained a units-required-attribute, and the number of units requested at that time are not the number of units that should be consumed for the completed operation, the caller should state with the units-consumed argument how many units should be consumed. The arguments of the release allocation are: grant handle, units consumed, and comment. The grant handle identifies the allocation grant created by a previous call to request allocation. The units-consumed argument identifies the number of units which should be consumed if the license policy is consumptive; this argument should only be used in combination with an earlier call to request allocation which specified a units requirement in a request extension. Omission of this argument indicates that the number of units to be consumed is the same as the number allocated previously. The comment argument is a comment which will be written to the log file 24 if release units are from a consumptive style license or if logging is enabled. The result is a return code indicating if the function succeeded, and, if not, why not.

The query allocation, or lm_query_allocation(), is used by licensed products which have received allocations by a previous request allocation call. The query is to obtain information from the server 10 or delegatee server 13 about the nature of the grant that has been made to the user and the license data used in making the grant, or to obtain a calling card (i.e., a request that a calling card be issued). Typically, the item read by this query function is the token field 52 which contains arbitrary information encoded by the license issuer and which may be interpreted as required by the stub 19 for the licensed product software 17, usually when a "private" allocation style or context is being employed. The arguments in this procedure call are the grant handle, and the subject. The grant handle identifies the allocation grant created by a previous call to request allocation. The subject argument is either "product use authorization" or "calling card request"; if the former then the result will contain a public copy of the product use authorization. If this argument is a calling card request and a calling card which matches the previous constraints specified in that request can be made available, the result will contain a calling card. If the subject argument is omitted, the result will contain an instance of the allocation class. The results of the query allocation call are (1) a return code, indicating whether the function succeeded, and, if not, why not, and (2) a result, which is either an allocation, a product use authorization or a calling card, depending on type and presence of the subject argument.

Referring to FIG. 5, the flow chart shows the actions at the client in its interface with the server. When the software product 17 is to be invoked, the unit 18 is first executed as indicated by the block 60, and the first action is to make a request allocation call via the stub 19, indicated by the block 61. The client waits for a return, indicated by the loop 62, and when a return is received it is checked to see if it is a grant, at decision block 63. If not, the error code in the return is checked at block 64, and if a return code indicates a retry is possible, block 65, control passes back to the beginning, but if no retry is to be made then execution is terminated. If the policy is to allow use of the product 17 without a license grant, this function is separately accounted for. If the decision point 63 indicates a grant was made, the grant handle is stored, block 66, for later reference. The program 17 is then entered for the main activities intended by the user. During this execution of product 17, or before or after, a query allocation call can be made, block 67, though this is optional and in most cases not needed. When execution of the program 17 is completed, the grant handle is retrieved, block 68, and a release allocation call is made, block 69. A loop 70 indicates waiting for the return from the server, and when the return received it is checked for an error code as before, and a retry may be appropriate. If the release is successfully acknowledged, the program exits.

Figure 6:
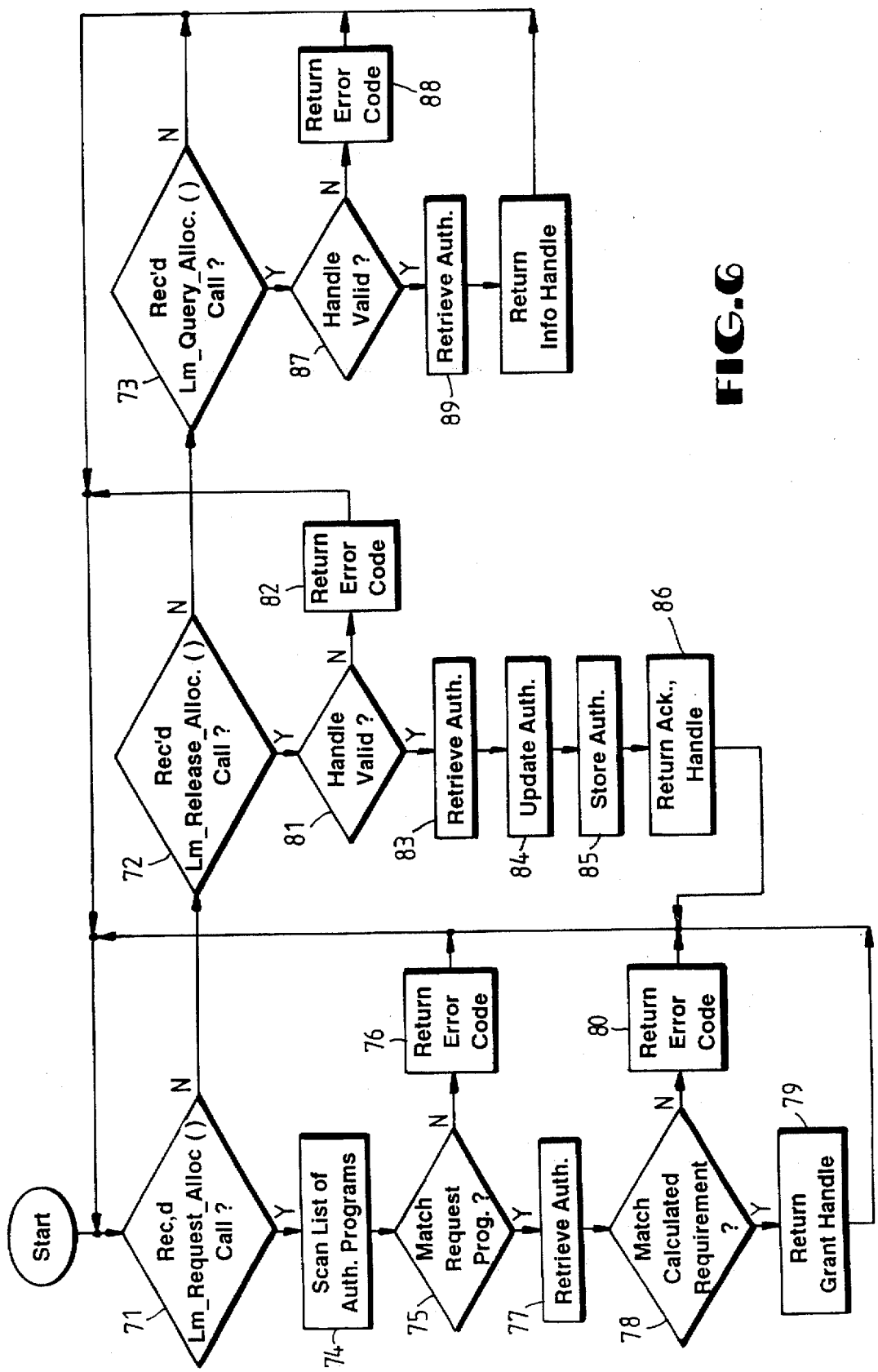
FIG. 6 is a logic flow chart of a program executed by a license server, in the system of FIG. 1, according to one embodiment of the invention.

Referring to FIG. 6, the actions of the server 10 or delegatee server 13 in executing the license management program 11 or 14, for the client interface, are illustrated in flow diagram form. A loop is shown where the server program is checking for receipt of a request, release or query call from its clients. The call would be a remote procedure call as discussed above, and would be a message communicated by a network, for example. This loop shows the decision blocks 71, 72 and 73. If a release allocation call is received, a list of products for which authorizations are stored is scanned, block 74, and compared to the product identity given in the argument of the received call, block 75. If there is no match, an error code is returned to the client, block 76, and control goes back to the initial loop. If the product is found, the authorization is retrieved from the database 23, block 77 (there may be more than one authorization for a given product, in which case all would be retrieved, but only one will be referred to here) and all of the information is matched and the calculations made depending upon the management policy of FIGS. 3 and 4, indicated by the decision block 78. If a grant can be made, it is returned as indicated at block 79, or if not an error code is returned, block 80. If a release allocation call is received, indicated by a positive at the decision block 72, the grant handle in the argument is checked for validity at block 81. If no match is found, an error code is returned, block 82, and control passes back to the initial loop. If the handle is valid, the authorization for this product is retrieved from the database 23 at block 83, and updated as indicated by the block 84. For example, if the license management style is allocative, the units are returned to the available pool. Or, in some cases, no update is needed. The authorization is stored again in the database, block 85, and a return made to the client, block 86, before control passes back to the initial loop. If the decision block 73 indicates that a query allocation call is received, again the grant handle is checked at block 87, and an error code returned at block 88 if not valid. If the grant handle matches, the authorization is retrieved from the database 23, at block 89, and a return is made to the client giving the requested information in the argument, block 90.

The basic allocation algorithm used in the embodiment of the license management system herein described, and implemented in the method of FIGS. 5 and 6, is very simple and can handle a very large proportion of known license unit allocation problems. However, it should be recognized that a more elaborate and expanded algorithm could be incorporated. Additions could be made in efforts to extend the allocation algorithm so that it would have specific support for optimizing unit allocation in a wider variety of situations. Particularly, sources of non-optimal allocations occurring when using the basic allocation algorithm are those that arise from combination and reservation handling.

The first step is formation of full context. The client stub 19 is responsible for collecting all specified platform and application subcontexts from the execution environment of the product 17 and forwarding these collected subcontexts to the license management server 13 or 10. The collection of subcontexts is referred to as the "full context" for a particular license unit allocation request.

The next step is retrieval of the context template. When the license manager receives an lm_request_allocation, it will look in its list of available product use authorizations (PUA) to determine if any of them conform to the product identifier provided in the lm_request_allocation call. The product identifier is composed of: product name, producer, version, release date. If any match is found, the license manager will extract from the matching PUA the context template. This template is composed of a list of subcontexts that are relevant to the process of determining unit requirements. Thus, a context template may indicate that the node-ID subcontext of a specific full context is of interest for the purposes of unit allocation. The context template would not specify any specific value for the node-ID; rather, it simply says that node-ID should be used in making the allocation computation.

The next step is masking the full context. Having retrieved the context template, the license manager will then construct an "allocation context" by filtering the full context to remove all subcontexts which are not listed in the context template. This allocation context is the context to be used in determining allocation requirements.

Then follows the step of determining if the request is new. The license manager maintains for each product use authorization a dynamic table which includes the allocation contexts of all outstanding allocations for that PUA (i.e., allocations that have been granted but have not yet been released). Associated with each entry in this table is some bookkeeping information which records the number of units allocated, the full context, etc. To determine if a recent lm_request_allocation requires an allocation of units to be made, the license manager compares the new allocation context with all those allocation contexts in the table of outstanding allocations and determines if an allocation has already been made to the allocation context. If the new allocation context does not already exist in the table, an attempt will be made to allocate the appropriate number of units depending on the values contained in the LURDM structure of the PUA and any LURTs that might be required. If an allocation context similar to that specified in the new allocation request does exist in the table, the license manager will verify that the number of units previously allocated are equal to or greater than the number of units which would need to be allocated to satisfy the new allocation request. If so, the license manager will return a grant handle to the application which indicates that the allocation has been made (i.e., it is a "shared allocation"—the allocated units are shared between two requests.) If not, the license manager will attempt to allocate a number of units equal to the difference between the number previously allocated and the number of units required.

The step of releasing allocations (FIG. 6, blocks 84–85) occurs when the license manager receives an lm_release_allocation call; it will remove the record in its dynamic allocation table that corresponds to the allocation to be released. Having done this, the license manager will then determine if the allocation to be removed is being shared by any other allocation context. If so, the units associated with the allocation being released will not be released. They will remain allocated to the remaining allocation contexts. Some of the units might be released if the license manager determines that the number of allocated units exceeds the number needed to satisfy the outstanding allocation contexts. If this is the case, the license manager will "trim" the number of allocated units to an appropriate level.

In summary, the two things that make this algorithm work are (1) the basic rule that no more than one allocation will be made to any single allocation context, and (2) the use of the context template to make otherwise dissimilar full contexts appear to be similar for the purposes of allocation.

The license designer's task, when defining basic policy, is then to determine which contexts should appear to be the same to the license manager. If the license designer decides that all contexts on a single node should look the same (context template=node-ID), then any requests that come from that node will all share allocations. On the other hand, a decision that all contexts should be unique (i.e., context template=process-ID) will mean that allocations are never shared.

This mechanism permits the system of the invention to dispose of the cumbersome, explicit support of license types having different scope such as the cluster licenses, node licenses, and process licenses found in prior license management systems including that of U.S. Pat. No. 4,937,863. Instead of defining a limited set of scopes (cluster, node, etc.), the system of this invention provides a general mechanism which allows an effectively unlimited range of allocation scopes to be defined.

Transitive licensing, as referred to above, is supported by the system of the invention by (1) calling authorizations, which are statements made in field 49 of the product use authorization 35 for one product (the "caller") to permit that product to call another product (the "callee"), and, (2) caller authorizations, which are statements made in field 49 of the product use authorization for one product (the "callee") to permit it to be called by another product (the "caller").

If calling or caller authorizations are to be exploited by products, then whenever one product calls another product, it must pass the callee a calling card 49a. This calling card 49a is an encoding of an identification of the caller as well as a statement by the license management system that a license unit allocation has been made to the caller which is passing the calling card. This calling card is then passed by the callee to the license management system for validation and, if the either the product use authorization of the caller carries an appropriate calling authorization or the product use authorization of the callee carries an appropriate caller authorization, the use of the callee by the caller will be authorized without requiring any additional license unit allocations.

Figure 7:
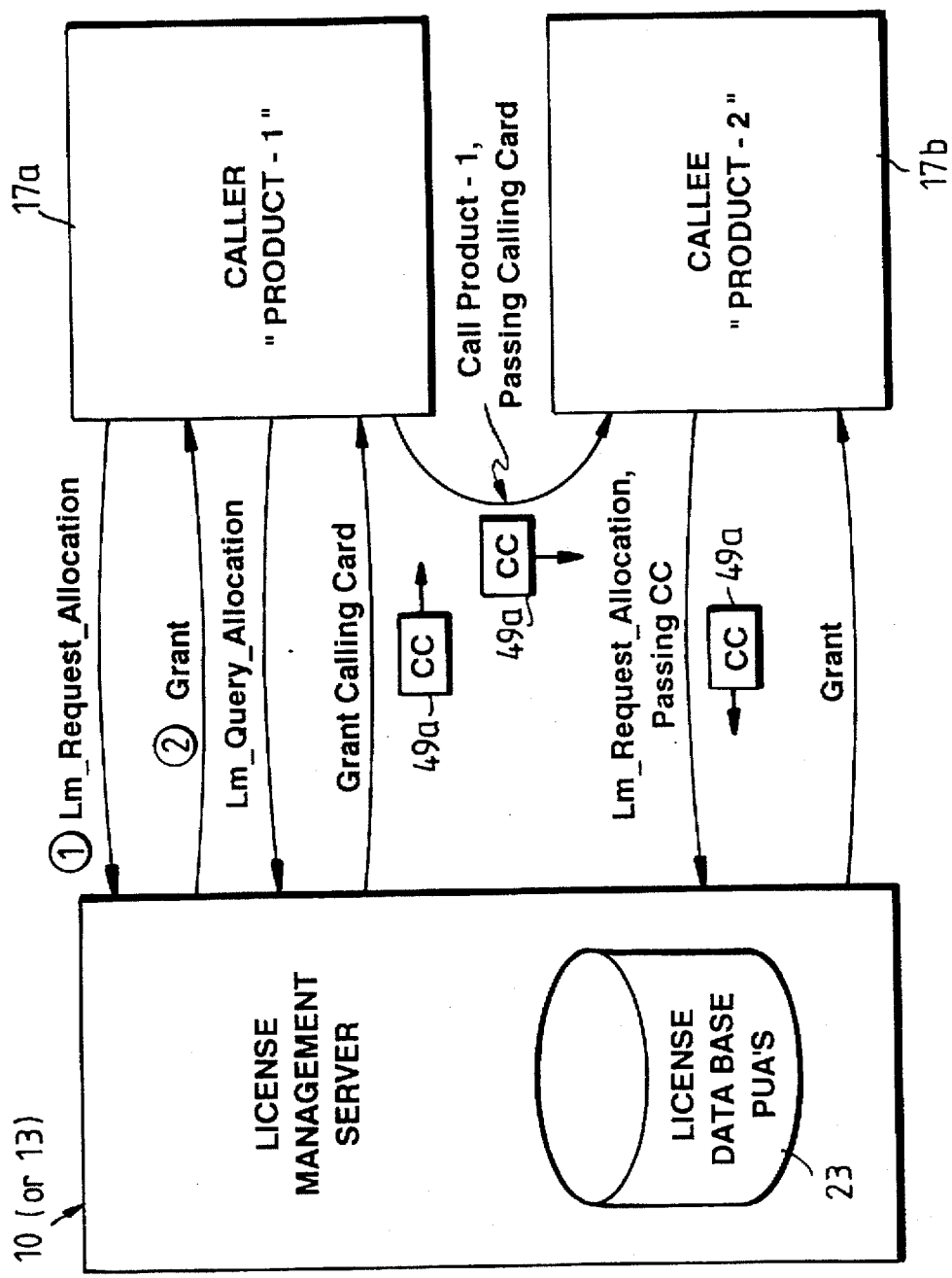
FIG. 7 is a diagram of the calls and returns made in an example of use of calling cards in the system of FIG. 1.

Referring to FIG. 7, the intercomponent interactions that occur when either calling or caller authorizations are being used are illustrated. This figure shows a license management server 10, a caller product 17a named "Product-1" and a callee product 17b named "Product-2". When Product-1 starts to run, it will make an lm_request_allocation call to the license management server 10 to obtain a grant handle for an allocation of some number of units of the Product-1 license. Either immediately, or at some later time, but always prior to making a call to Product-2, Product-1 will call lm_query_allocation, passing the grant handle received earlier and specifying that it wants a calling card for the product named "Product-2." If the field 49 of the product use authorization 35 used to satisfy the grant represented by the grant handle carries a calling authorization in field 49 naming "Product-2," the license manager will create a calling card 49a which includes the statement that a calling authorization exists and pass this calling card back to Product-1. If the calling authorization does not exist, the calling card passed to Product-1 will contain a statement to that effect.

Once Product-1 has successfully obtained a calling card 49a from the license manager, it will then make a call to Product-2, passing the calling card along with any other initialization parameters that would normally be used when starting Product-2. Product-2 will then pass that calling card to the license manager as part of its lm_request_allocation call and the license manager will determine if the calling card is valid. Note that calling cards become invalid once the process which received the calling card makes an lm_release_allocation call or terminates abnormally. If the calling card is valid, and it indicates that a calling authorization is present, the license manager will verify this statement and if found to be true, will return a grant handle to Product-2. If, on the other hand, the calling card carries an indication that no calling authorization is present, the license manager will attempt to find a product use authorization for Product-2 that contains a caller authorization naming Product-1 as an authorized caller. If the caller authorization is found, a grant handle will be passed back to Product-2. If not, the license manager will ignore the calling card and proceed with the normal lm_request_allocation logic.

The requirement to be passing calling cards between products requires that both the caller and the callee be "aware" of the fact that calling and caller authorizations may be used. This is one of the few examples of a requirement for a product 17 to become actively involved in the licensing problem when using the licensing management system of the invention. However, since the use of calling/caller authorizations if a fairly "sophisticated" and powerful feature, it is considered acceptable to impose this burden on application coders.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method executed in a computer system for managing access to software items, the method comprising the steps of:

maintaining a store of license authorizations for software items, each of said license authorizations including an identification of a corresponding software item and one or more policy components used to define a license management policy for said corresponding software item, each of said license authorizations including a number of units of license use, and wherein said policy components defining said license management policy include a policy component identifying an allocative policy and a consumptive policy, said allocative policy permitting return of units allocated to a client after the client completes a requested use making said units returned available for use by another client, and said consumptive policy not permitting return of units;

sending a request from a client executing in said computer system to a server to obtain access to said software item, said request including data identifying said client and said software item;

retrieving from said store, in response to said request, a license authorization corresponding to said software item;

determining whether to grant or refuse said request in accordance with said license authorization; and sending a response to said client indicating whether said request has been granted or refused.

2. The method of claim 1 wherein said store is maintained by a license server, said request is sent to said license server, and said response is produced and sent by said license server.

3. The method of claim 2 wherein said license authorization is a data arrangement received by said license server from a license issuer.

4. The method of claim 2 wherein said license server and said client reside on nodes on a computer network.

5. The method according to claim 4 wherein said request is sent by said client as a remote procedure call, and said response sent to said client is in a return of said remote procedure call.

6. The method of claim 1 wherein each of said license authorizations includes a number of units available for use, each of said units being an arbitrary quantitative measure of software item usage in said computer system, and each of said policy components includes a plurality of ways of allocating a portion of said units to a client.

7. The method of claim 1 wherein one of said policy components is a context including one or more values identifying an environment in which said software item is used, and wherein said request includes at least one element that corresponds to one of said values identifying the environment for which said client is requesting and identifies the environment for which said client is requesting use of said software item.

8. The method of claim 7 wherein said context further includes a platform context describing a computer platform upon which said software item is used, said platform context identifying at least one of the following: a login domain, a node in the computer system, a user name, a product name, an operating system, an execution domain, or a type of computer processor.

9. The method of claim 8 wherein said context further includes an application context identifying an element which is supplied by said software item.

10. The method of claim 8 wherein said context is a context name formed by concatenating a plurality of data values.

11. The method of claim 1 wherein said policy components associated with a corresponding software item include:

a style component providing alternate ways of allocating license units, said license units being a quantitative measure of usage of said corresponding software item;

a context component identifying an environment in which said corresponding software item is used; and a usage requirement component providing alternative ways of determining a usage requirement for a client and wherein said request includes a plurality of elements associated with said style component, said context component, and said usage requirement component.

12. The method of claim 1 wherein said step of determining whether to grant or refuse said request includes the step of:

comparing said identification of said client and said software item included in said request with other data describing said software item included in said license authorization retrieved from said store.

13. The method of claim 1 wherein said policy components define a plurality of licensing alternatives.

14. The method of claim 1 further including the steps of:

receiving a release allocation request from said client executing in said computer system to release access to an allocated software item; and modifying, in response to said receiving step, one of said license authorizations corresponding to said allocated software item in accordance with said release allocation request.

15. A system for managing the execution of software products in a computer system, the system comprising:

means for maintaining a store of license documents for software products, each of said license documents including an identification of a corresponding software product and one or more policy components used to define a license management policy for said corresponding software product, each of said license documents including a number of units of license use, and wherein said policy components defining said license management policy include a policy component identifying an allocative policy and a consumptive policy, said allocative policy permitting return of units allocated to a client after the client completes a requested use making said units returned available for use by another client, and said consumptive policy not permitting return of units;

means for sending a request from said client executing in a computer system to a server to obtain permission to use said software product, said request including data identifying said client and said software product;

means for retrieving, in response to said means for send a request, a license document from said store that corresponds to said software product;

means for determining, using said license document, whether to grant or refuse said request; and means for sending a response to said client indicating whether said request has been granted or refused.

16. The system of claim 15 wherein said means for maintaining, said means for retrieving and said means for sending a response to said client are included in a license server in a distributed computing environment, and said means for sending a request from a client is included in a client node in said distributed computing environment.

17. The system of claim 16 wherein said request is a remote procedure call, and said response sent to said client is included in a return of said remote procedure call.

18. The system of claim 16 wherein said license document is a data arrangement received by said license server from a license issuer.

19. The system of claim 15 wherein one of said policy components is a context that includes a platform context describing a computer platform upon which said software product is used, said platform context identifying at least one of the following: a login domain, a node in the computer system, a user name, a product name, an operating system, an execution domain, or a type of computer processor.

20. The system of claim 19 wherein said context further includes an application context identifying an element which is supplied by said software product.

21. The system of claim 15 wherein said policy components associated with a corresponding software product include:

a style component providing alternate ways of allocating license units, said license units being a quantitative measure of usage of said corresponding software product;

a context component identifying an environment in which said corresponding software product is used; and a usage requirement component providing alternative ways of determining a usage requirement for a client, and wherein said request includes a plurality of elements associated with said style component, said context component, and said usage requirement component.

22. The system of claim 15 further including:

means for receiving a release allocation request from said client to release access to an allocated software item; and means, coupled to said receiving means, for modifying one of said license authorizations corresponding to said allocated software item in accordance with said release allocation request.

23. A method executed in a computer system for managing licensed software comprising the steps of:

generating, by a license issuer, a license authorization for each software product licensed software;

sending said license authorization to a license manager;

maintaining, by a license manager, a database of license authorizations generated by said license issuer, wherein each of said license authorizations in said database includes a first portion identifying a corresponding software product and a second portion identifying a license management policy for said corresponding software product, said second portion having multiple policy components including client characteristics one of said policy components being a context including one or more values identifying an environment in which said corresponding software product is used, said context including an application context identifying an element which is supplied by said corresponding software product;

sending, to said license manager, a request by a client to obtain permission to use a software product, said request containing data identifying the client;

retrieving, by said license manager in response to said request, a license authorization from said database corresponding to said software product;

determining, using said license authorization and at least one of said policy components, whether to grant or refuse said request;

sending, from said license manager to said client, a response indicating whether said request has been granted or refused; and determining, using said application context, whether the client may use said corresponding software product.

24. The method of claim 23 wherein said license manager is a license server, said request is sent to said license server, and said client and said license server are included in a distributed computer system.

25. The method of claim 24 wherein said request is sent by said client as a remote procedure call, and said response sent to said client is included in a return of said remote procedure call.

26. The method of claim 23 wherein said license authorization defines a license use period having a start time and end time and said license manager uses said start time and said end time to determine whether to grant or refuse said request.

27. A memory storing a computer program for managing access to software items comprising:

means for maintaining a store of license authorizations for said software items, each of said license authorizations including an identification of a corresponding software item and one or more policy components used to define a license management policy for said corresponding software item, one of said policy components being a platform context describing a computer platform upon which said software product is used, said platform context identifying at least one of the following: a login domain, a node in the computer system, a user name, a product name, an operating system, an execution domain, or a type of computer processor;

means for sending a request from said client executing in a computer system to a server to obtain permission to use said software item, said request including data identifying the client and the software item;

means for retrieving, in response to said means for sending a request, a license authorization from said store that corresponds to said software item;

means for determining, using said license authorization, whether to grant or refuse said request; and means for sending a response to said client indicating whether said request has been granted or refused.

28. The memory of claim 27 wherein said policy components being used to define a plurality of license alternatives.

29. The memory of claim 27 further comprising:

means for receiving a release allocation request from said client to release access to an allocated software item; and means, coupled to said receiving means, for modifying one of said license authorizations corresponding to said allocated software item in accordance with said release allocation request.

* * * * *